United States Patent
Koike et al.

(10) Patent No.: US 6,787,268 B2
(45) Date of Patent: Sep. 7, 2004

(54) ELECTROLYTE

(75) Inventors: Tsuneaki Koike, Valencia, CA (US); Hiroyuki Yumoto, Stevenson Ranch, CA (US); Hisashi Tsukamoto, Saugus, CA (US)

(73) Assignee: Quallion LLC, Sylmar, CA (US)

( * ) Notice: Subject to any disclaimer, the term of this patent is extended or adjusted under 35 U.S.C. 154(b) by 0 days.

(21) Appl. No.: 10/335,168

(22) Filed: Dec. 31, 2002

(65) Prior Publication Data

US 2004/0043299 A1 Mar. 4, 2004

Related U.S. Application Data (60) Provisional application No. 60/408,100, filed on Sep. 3, 2002.

(51) Int. Cl.[7] ................................................. H01M 6/16
(52) U.S. Cl. ....................... 429/332; 429/329; 429/327; 429/326; 429/163; 429/231.4; 429/231.8; 29/623.1; 607/116
(58) Field of Search ................................ 429/330, 332, 429/333, 334, 335, 163, 231.4, 231.8, 326, 327, 329, 382; 29/623.1; 607/116

(56) References Cited

U.S. PATENT DOCUMENTS

| | | |
|---|---|---|
| 5,478,671 A | 12/1995 | Idota |
| 5,478,674 A | 12/1995 | Miyasaka |
| 5,707,756 A | 1/1998 | Inoue et al. |
| 6,232,021 B1 | 5/2001 | Negoro |
| 6,383,688 B1 | 5/2002 | Inagaki et al. |
| 6,432,584 B1 | 8/2002 | Visco et al. |
| 2002/0037450 A1 | 3/2002 | Suzuki et al. |
| 2002/0039688 A1 | 4/2002 | Barker et al. |
| 2002/0055047 A1 | 5/2002 | Satoh et al. |
| 2002/0061446 A1 | 5/2002 | Gan et al. |
| 2002/0061450 A1 | 5/2002 | Tsujioka et al. |
| 2002/0064712 A1 | 5/2002 | Sekino et al. |
| 2002/0086216 A1 | 7/2002 | Sekino et al. |
| 2002/0090551 A1 | 7/2002 | Gan et al. |
| 2002/0110739 A1 | 8/2002 | McEwen et al. |
| 2002/0122973 A1 | 9/2002 | Manev et al. |
| 2002/0136950 A1 * | 9/2002 | Gan et al. .................... 429/212 |
| 2003/0194605 A1 * | 10/2003 | Fauteux et al. ............. 429/149 |

FOREIGN PATENT DOCUMENTS

| | | | |
|---|---|---|---|
| DE | 101 11 410 | * | 7/2002 |
| EP | 1 207 567 A2 | | 5/2002 |
| EP | 1 091 963 B1 | | 10/2002 |
| JP | 05242910 A2 | | 9/1993 |
| WO | WO 01/24305 A1 | | 4/2001 |
| WO | WO 02/068432 A1 | | 9/2002 |
| WO | WO 02/068433 A1 | | 9/2002 |
| WO | WO 02/071528 A2 | | 9/2002 |

OTHER PUBLICATIONS

W. Xu et al., LiBOB and Its Derivatives Weakly Coordinating Anions, and the Exceptional Conductivity of Their Nonaquesous Solutions, Electrochemical and Solid–Sate Letters, 2001; E1–E4, 4(1).

K. Xu et al., LiBOB as Salt for Lithium–Ion Batteries, A Possible Solution for High Temperature Operation, Electrochemical and Solid State Letters, 2002, pp. A26–A29, vol. 5(1).

(List continued on next page.)

*Primary Examiner*—Laura Weiner
(74) *Attorney, Agent, or Firm*—M. Elizabeth Bush (57) ABSTRACT

An electrolyte for a battery comprises LiBOB salt in gamma butyrolactone and a low viscosity solvent. The low viscosity solvent may comprise a nitrile, an ether, a linear carbonate, or a linear ester. This electrolyte is suitable for use in lithium ion batteries having graphite negative electrodes. Batteries using this electrolyte have high conductivity, low polarization, and high discharge capacity.

20 Claims, 5 Drawing Sheets

OTHER PUBLICATIONS

W. Xu et al., Structures of Orthoborate Anions and Physical Properties of Their Lithium Salt Nonaqueous Solutions, Journal of the Electrochemical Society, 2003, E74–E80, 150(1).

T. Fujii et al., Application of LiBOB as an Electrolyte Salt for 4 V Class Lithium Ion Rechargeable Cells, whttp://www2.electrochem.org/cgi–bin/abs?mtg=202&abs=0203, United States.

Xu et al., Lithium Bis(oxalato)borate Stabilizes Graphite Anode in Propylene Carbonate, Electrochemical and Solid State Letters, 2002, A259–A262, 5(11).

Jeffsol Carbonate Distributor Sales, http://www.huntsman.com/performance_chemicals/Media/JEFFSOL_Carbonate_Distributor_Sales.PDF, p. 7, No Date.

Reactive Applications of Cyclic Alkylene Carbonates, John H. Clements, http://www.huntsman.com/performance_chemicals/Media/Reactive_Applications_of_Cyclic_Alkylene_Carbonates_110903.pdf, No Date.

Product Detail, Vinylene carbonate. https://www/sigmaaldrich.com/cgi–bin/hsrun/Suite7/Suite/Suite.hjx;start=Suits.HsAdvancedSearch.formAction, No Date.

* cited by examiner

ELECTROLYTE

REFERENCE TO PRIOR FILED APPLICATIONS

This application claims the benefit of U.S. Provisional Application No. 60/408,100 filed Sep. 3, 2002.

STATEMENT REGARDING FEDERALLY SPONSORED RESEARCH OR DEVELOPMENT

This invention was made with United States Government support under NIST ATP Award No. 70NANB043022 awarded by the National Institute of Standards and Technology (NIST). The United States Government has certain rights in the invention.

TECHNICAL FIELD

This invention relates to an electrolyte and more particularly to an electrolyte for use in a battery.

BACKGROUND

An effective solid electrolyte layer (SEI) must be created at the surface of a graphite negative electrode of a battery in order to keep the electrolyte from decomposing. Various electrolytes comprising certain combinations of salts and solvents produce SEI layers of various qualities. Typical lithium ion batteries use an electrolyte comprising $LiPF_6$ in a carbonate solvent, with 1.2-M $LiPF_6$ in ethylene carbonate (EC):diethyl carbonate (DEC) being typical in the battery industry. EC is solid at room temperature and requires additional processing steps for employing in an electrolyte. Graphite electrodes have a fragile structure and, until the invention of the electrolyte described herein, have required the use of EC for forming the SEI layer without damaging the graphite structure. By contrast, hard carbon negative electrodes are not as easily broken and therefore can use solvents other than EC to form the SEI layer. However, while hard carbon has a higher capacity than graphite, it can absorb a lot of moisture and has a large irreversible capacity, making graphite a much more desirable electrode material than hard carbon. Lithium metal does not require EC to form an SEI layer, but is useful only for a primary battery, not rechargeable. Vinylene carbonate (VC) and vinyl ethylene carbonate (VEC) can aid in creating an SEI layer, but can only be used in quantities up to about 3% because an excess of these solvents creates degradation at the positive electrode; with this small quantity of SEI-forming solvent, only a thin SEI layer is created, with all of the VC or VEC consumed during the first charging cycle; therefore, another SEI-forming component such as EC must be added.

SUMMARY

The electrolyte of the present invention comprises a salt or mixture of salts comprising lithium bis(oxalato) borate (LiBOB) in a lactone solvent or mixture of lactone solvents, preferably gamma-butyrolactone (GBL), combined with a low viscosity solvent or mixture of low viscosity solvents, and preferably does not contain a solvent that is solid at room temperature, such as ethylene carbonate (EC). This inventive electrolyte is useful in primary and secondary batteries, and is especially suitable for a lithium ion battery having a graphite negative electrode, forming a functional SEI layer that does not readily decompose.

LiBOB is more soluble in lactone solvents, such as gamma-butyrolactone (GBL), than in commonly used carbonate solvents, such as ethylene carbonate (EC) and propylene carbonate (PC). Using a lactone solvent to dissolve LiBOB electrolyte produces a high salt concentration electrolyte, greatly improving conductivity as compared with using a carbonate solvent.

This electrolyte system has a wide operating temperature range and therefore can be safely used in many applications, including satellites and implantable medical devices. For example, a high temperature sterilization process could not be used for many electrolytes; the salt $LiPF_6$ decomposes at about 80° C., and DEC boils at about 126° C. By contrast, LiBOB is stable at 300° C., and GBL boils at about 206° C., making this combination ideal for high temperature sterilization. At the other temperature extreme, EC has poor low temperature performance due to its high freezing point of around 37–39° C., making it very viscous at low temperatures, and therefore less desirable for applications in which low temperature operation is important.

Furthermore, in the case of a leak, unlike fluorine-containing salts such as $LiPF_6$, LiBOB does not form HF when mixed with bodily fluid, and is therefore safer than $LiPF_6$. While $LiBF_4$ decomposes at a lower rate than $LiPF_6$ and is therefore slower to form HF, it has lower conductivity than $LiPF_6$ due to its lower dissociation.

DETAILED DESCRIPTION

The following text describes the preferred mode presently contemplated for carrying out the invention and is not intended to describe all possible modifications and variations consistent with the spirit and purpose of the invention. The scope of the invention should be determined with reference to the claims.

Figure 1A:
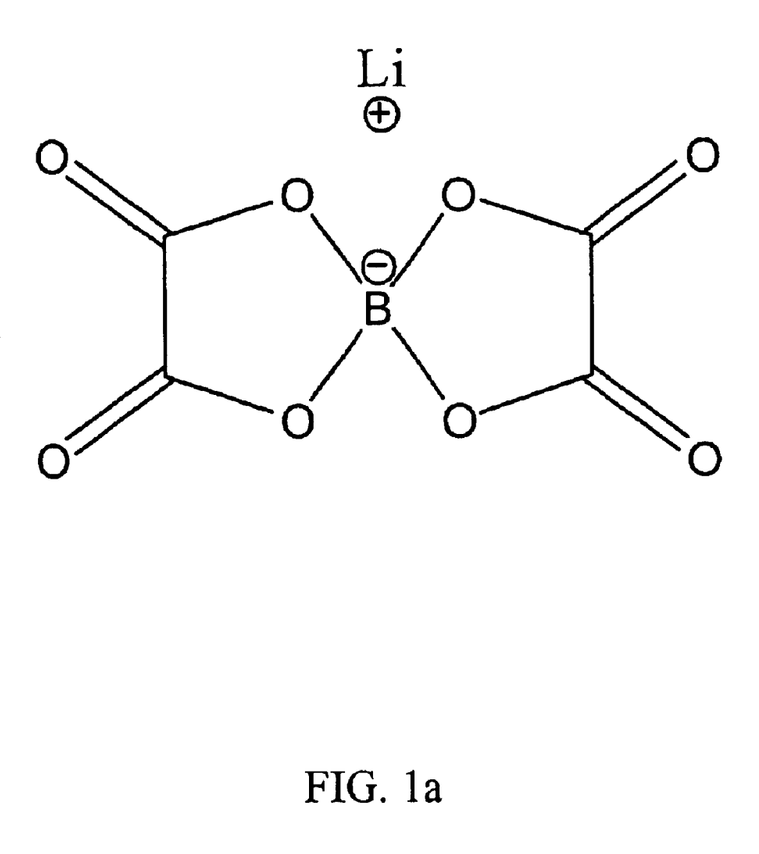
FIG. 1a is the chemical formula of the salt in the electrolyte of the present invention and FIG. 1b is the chemical formula of GBL.
Figure 1B:
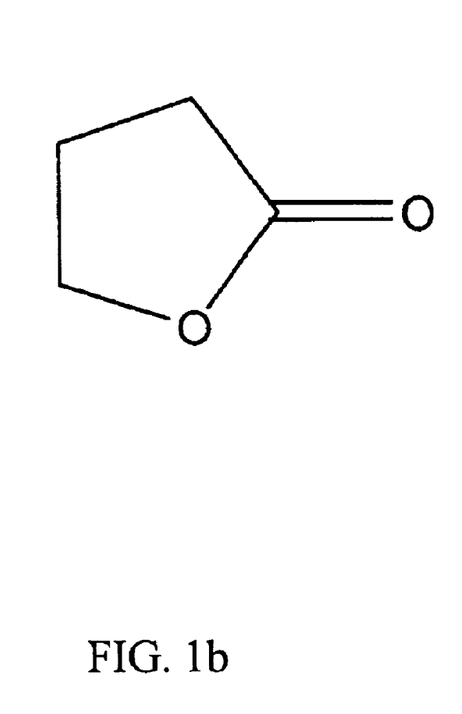

The electrolyte of the present invention is a solution of LiBOB salt, a low viscosity solvent, and a lactone, for example, gamma-butyrolactone (GBL). FIG. 1a is the chemical formula of the LiBOB salt in the electrolyte of the present invention, and FIG. 1b is the chemical formula of GBL.

A typical electrolyte comprises 1.2-M $LiPF_6$ in EC:DEC. The viscosity of EC is about 1.86 centipoise (cP) at 40° C. GBL has a viscosity of about 1.7 cP at room temperature. A low viscosity solvent is one that will lower the overall viscosity of the electrolyte comprising LiBOB and GBL and is therefore less viscous than GBL. Therefore, the low viscosity solvent itself has a viscosity of less than about 1.7 cP and more preferably less than about 1 cP. Low viscosity solvents can be chosen from among the following: nitriles such as acetonitrile, ether such as dimethyl ether (DME) or tetrahydrofuran (THF), linear carbonates such as diethyl carbonate (DEC) and methyl ethyl carbonate (MEC), and linear esters such as propyl acetate (PA) and methyl acetate (MA). An advantage of using a noncarbonate low viscosity electrolyte is that carbonates tend to generate $CO_2$ gas when decomposing, which can cause the battery to swell.

Figure 2:
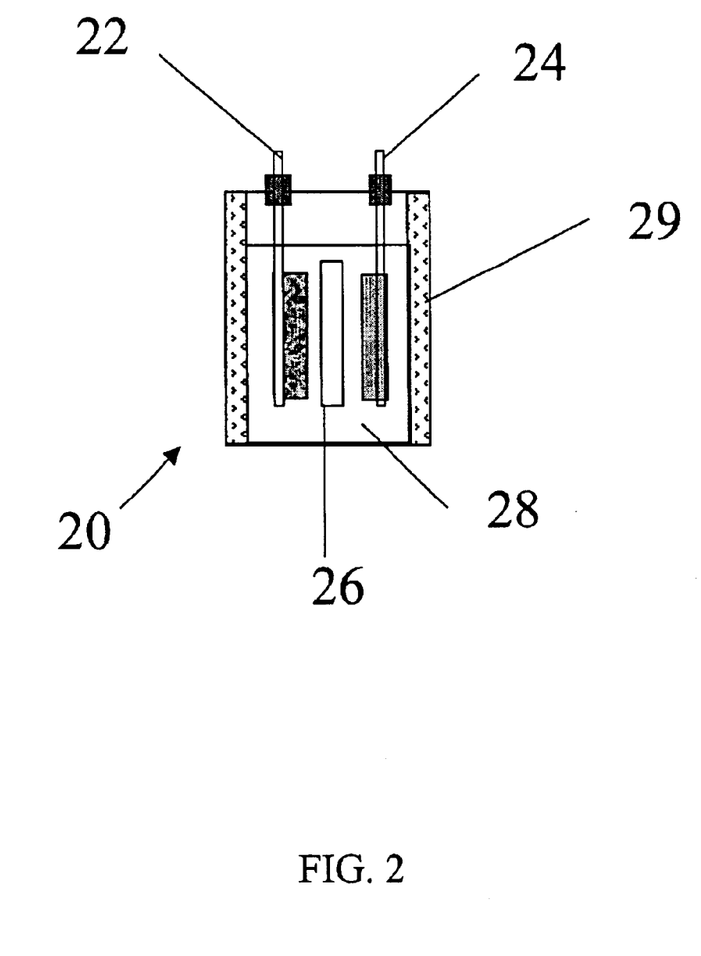
FIG. 2 shows the test set up for single cell tests described herein.

FIG. 2 shows the test set up for tests carried out to ascertain rate and cycle life properties of the electrolyte of the present invention using a single cell 20. A negative electrode 22 comprising graphite active material on a copper substrate is separated from a positive electrode 24 comprising a positive active material on an aluminum substrate by a separator 26. The electrodes 22 and 24, separator 26, and electrolyte 28 are enclosed by an aluminum foil bag 29 to form cell 20.

Figure 3:
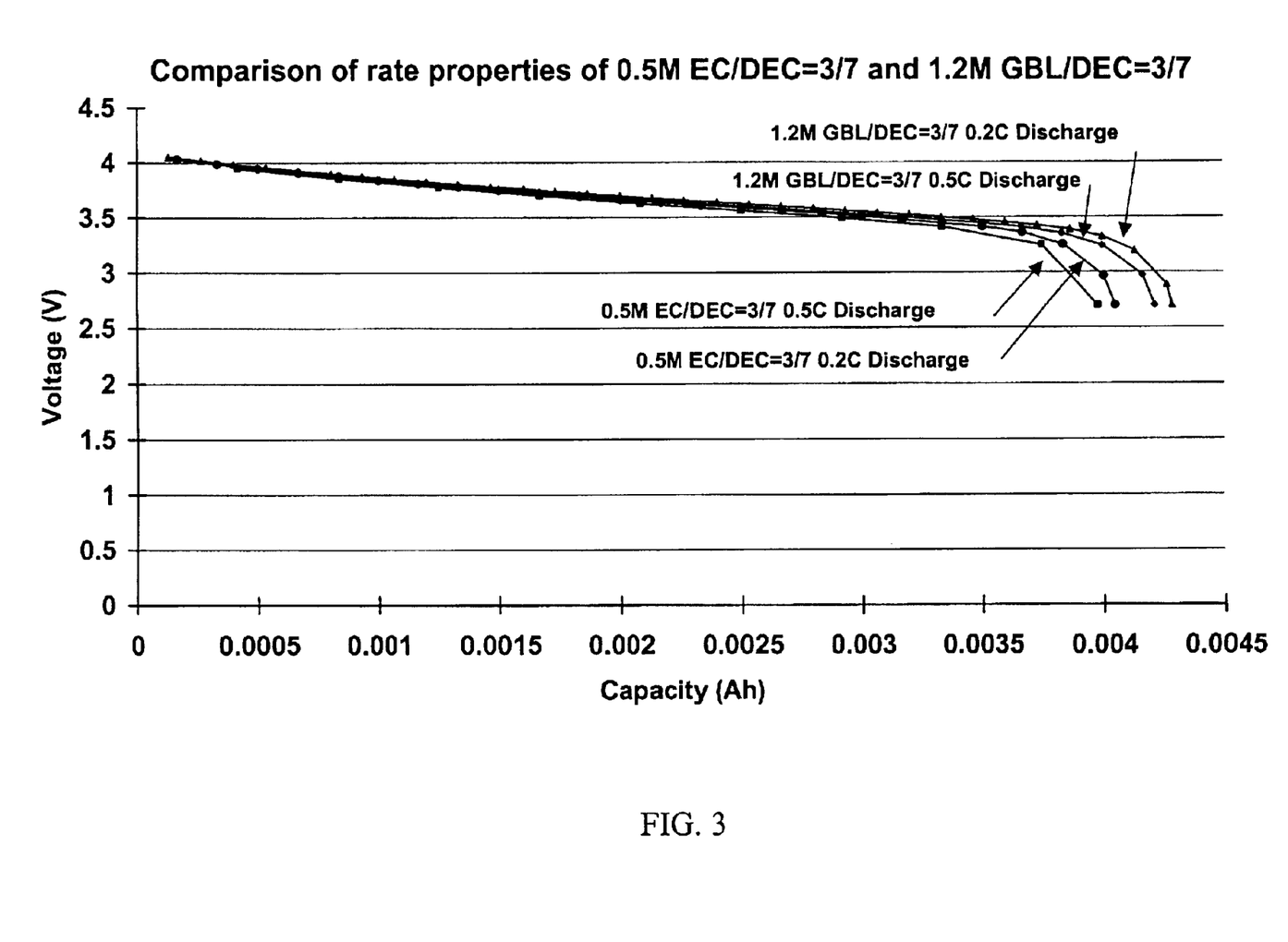
FIG. 3 is a graph of the comparison of rate properties of an electrolyte comprising LiBOB in different solvents.

FIG. 3 is a graph of the comparison of rate properties of an electrolyte comprising LiBOB in different solvents at two different discharge rates. LiBOB is much more soluble in GBL than in EC. 0.5-M LiBOB in 3:7 EC:DEC, which is a commonly-used solvent combination, is a saturated solution, whereas 1.2-M LiBOB in 3:7 GBL:DEC is close to saturated. Because so much more LiBOB salt can dissolve in 3:7 GBL:DEC than in 3:7 EC:DEC, the conductivity can be made much higher for 3:7 GBL:DEC than for 3:7 EC:DEC. This increase in conductivity reduces polarization, which leads to greater discharge capacity. Therefore, GBL mixed with a low viscosity solvent enables LiBOB, which is inherently safer than $LiPF_6$ and $LiBF_4$, to be used where large discharge capacity is required.

Figure 4:
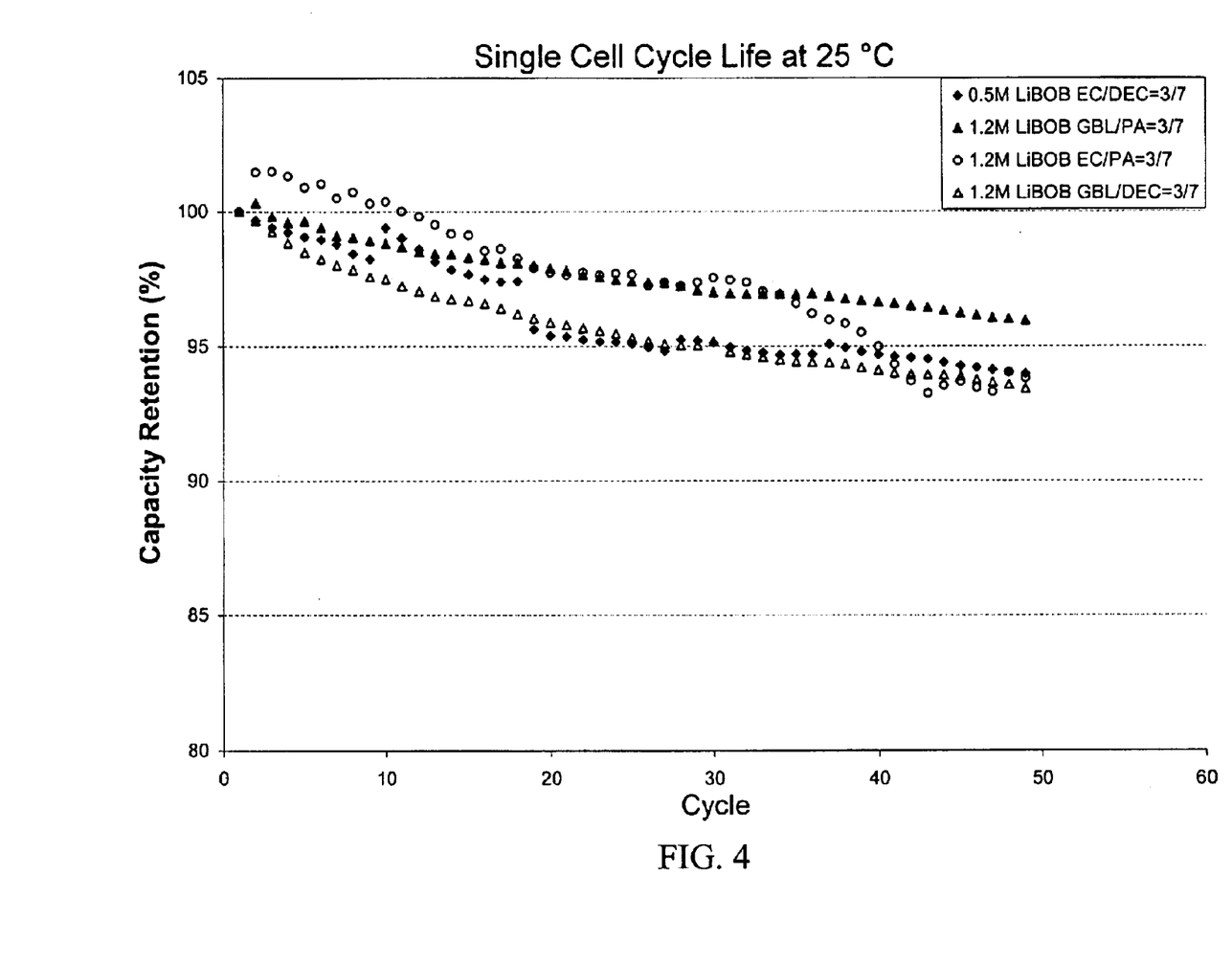
FIG. 4 is a graph showing capacity retention data of cells using electrolytes of the present invention compared with cells using electrolytes containing EC.

FIG. 4 is a graph showing capacity retention of single cells using electrolytes of the present invention compared with cells using electrolytes containing EC, using a graphite negative electrode 22 and $LiNi_{0.8}Co_{0.15}Al_{0.05}O_2$ positive electrode 24 using the setup as shown in FIG. 2. Both of the inventive solvent combinations shown have good capacity retention, with LiBOB in GBL/PA somewhat better than LiBOB in GBL/DEC.

Figure 5:
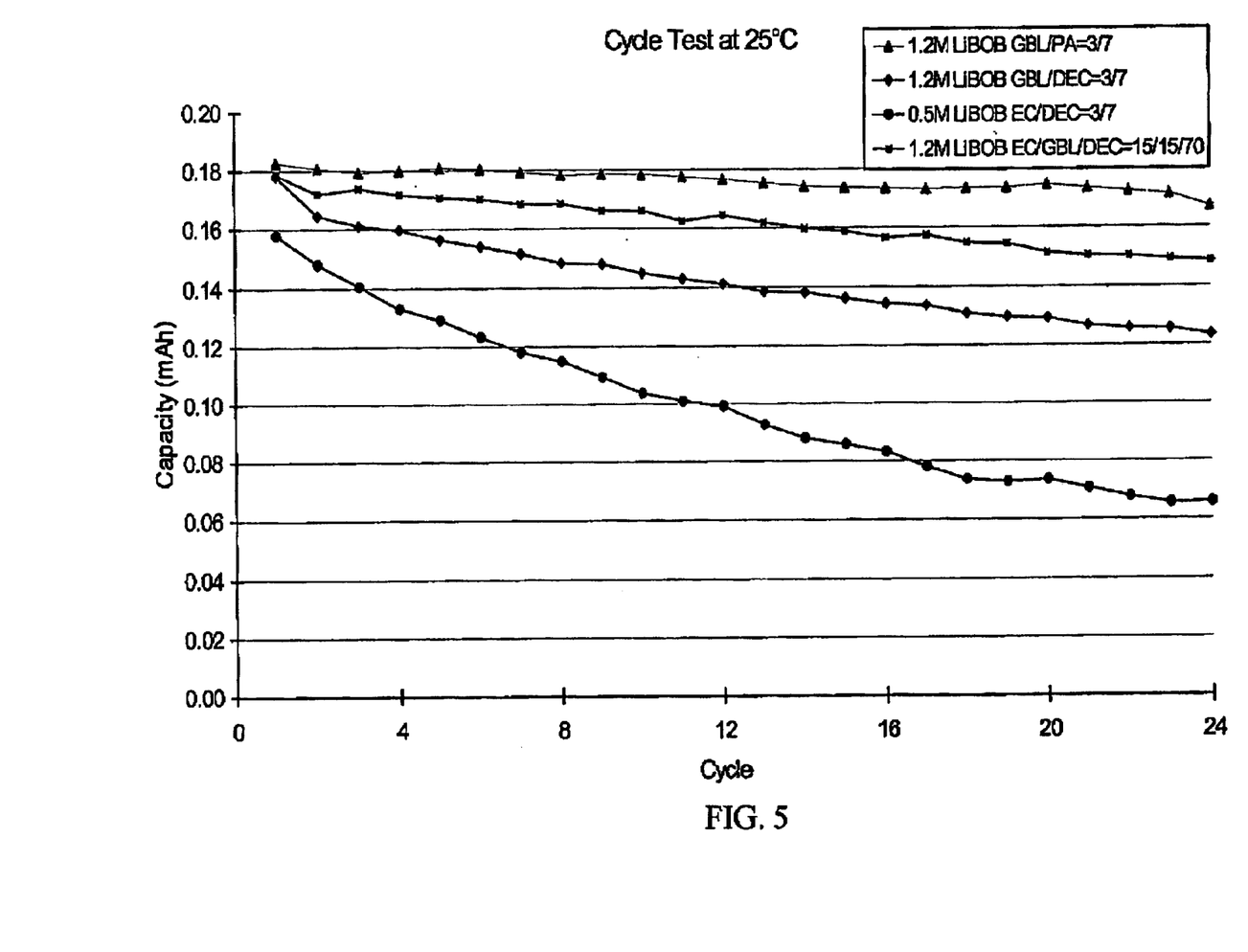
FIG. 5 is a graph showing capacity cycle life data of cells using electrolytes of the present invention compared with cells using electrolytes containing EC.

FIG. 5 is a graph showing cycle life data of spiral wound batteries using the same electrolytes of the present invention as in FIG. 4 compared with cells using electrolytes containing EC. The tests were done using a graphite negative electrode 22 and $LiCoO_2$ positive electrode 24. In this test, the starting discharge capacity at the first cycle is less important than the slope of the curve, which is ideally zero. Both of the present invention solvent combinations were shown to have good cycle life, comparable to or better than those containing EC. Therefore, the inventors have discovered that EC is not a necessary electrolyte component for forming an SEI layer on graphite, and that the combination of LiBOB with GBL and a low viscosity solvent such as PA or DEC is suitable for use as a battery electrolyte.

An electrolyte of the present invention may be made simply by combining a measured mass of GBL with a measured mass of low viscosity solvent, such as PA, then dissolving in a measured mass of LiBOB salt. The entire process may be completed at room temperature, or even lower, if desired.

By contrast, an electrolyte containing EC requires first melting the EC at elevated temperature such as in an oven in a dry environment, which can take about 5 hours for a 1-L bottle. Then the melted EC must be transferred immediately to an argon box and accurately weighed. Then it must be quickly combined with one or more additional weighed solvents, and then the measured mass salt dissolved before the EC begins to recrystallize. Because of the additional steps of melting the EC and the required use of heat, manufacturing an EC-containing electrolyte is more expensive than manufacturing the electrolyte of the present invention. Scaling up the EC-containing electrolyte manufacturing process is costly, requiring expensive equipment.

A battery of the present invention may be made by housing an electrode assembly in a battery case and inserting an electrolyte as described herein into the case, wherein the electrolyte comprises LiBOB salt in a combined solvent of lactone, preferably GBL, and a low viscosity solvent. The negative electrode of the electrode assembly may comprise graphite, hard carbon, lithium, lithium alloy, SiO, Si, SnO, Sn, and/or any other negative electrode material known in the art. The negative electrode may further comprise a negative electrode substrate made of copper, titanium, nickel, or stainless steel. The positive electrode may comprise a carbon fluoride, a cobalt oxide, a nickel oxide, a nickel cobalt oxide, a manganese oxide, a manganese cobalt oxide, a nickel cobalt manganese oxide, silver vanadium oxide (SVO), a lithium titanium oxide, iodine, and/or any other positive electrode material known in the art. The positive electrode may further comprise a positive electrode substrate made of aluminum, nickel, titanium, or stainless steel. The battery may be a primary or secondary (rechargeable) battery. If it is a rechargeable battery, it may be a lithium ion battery having a liquid electrolyte, or may have a polymer electrolyte, which could be a gel or a solid in combination with a liquid electrolyte. For an implantable medical device, the device housing and/or the battery, which may be housed within the device housing, is hermetically sealed. For a medical device requiring high temperature sterilization or for other high temperature applications, the low viscosity solvent is preferably chosen to have a high boiling point, such as greater than 126° C.

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

What is claimed is:

1. An electrolyte comprising:
   one or more salts including LiBOB;
   a lactone or mixture of lactones; and
   one or more low viscosity solvents including a linear ester.

2. The electrolyte of claim 1 wherein said one or more salts does not contain fluorine.

3. The electrolyte of claim 1 wherein said lactone or mixture of lactones includes gamma-butyrolactone.

4. The electrolyte of claim 1 wherein said one or more low viscosity solvents including a linear ester includes propyl acetate.

5. The electrolyte of claim 1 wherein the concentration of LiBOB is greater than 0.5 M.

6. The electrolyte of claim 1 wherein the concentration of LiBOB is greater than 1.0 M.

7. The electrolyte of claim 1 wherein the concentration of LiBOB is about 1.2 M.

8. A lithium battery comprising:
   a battery case;
   an electrode assembly housed in said case; and
   the electrolyte of claim 1.

9. The battery of claim 8 wherein said battery is rechargeable.

10. The battery of claim 8 wherein said battery is a lithium ion battery.

11. The battery of claim 8 wherein said battery is a lithium polymer battery.

12. The battery of claim 8 wherein said electrode assembly comprises a graphite negative electrode.

13. The battery of claim 8 wherein said lactone comprises gamma-butyrolactone.

14. The battery of claim 8 wherein said one or more low viscosity solvents including a linear ester includes methyl acetate.

15. The battery of claim 8 wherein said one or more low viscosity solvents including a linear ester includes methyl acetate.

16. The battery of claim 8 wherein the concentration of LiBOB is greater than 0.5 M.

17. The battery of claim 8 wherein the concentration of LiBOB is greater than 1.0 M.

18. The battery of claim 8 wherein the concentration of LiBOB is about 1.2 M.

19. An implantable medical device comprising the battery of claim 8.

20. A method for making a battery comprising the steps of:

providing a battery case;

housing an electrode assembly within the battery case; and inserting the electrolyte of claim 1 into said battery case.

* * * * *

UNITED STATES PATENT AND TRADEMARK OFFICE
CERTIFICATE OF CORRECTION

PATENT NO. : 6,787,268 B2
DATED : September 7, 2004
INVENTOR(S) : Tsuneaki Koike et al.

It is certified that error appears in the above-identified patent and that said Letters Patent is hereby corrected as shown below:

Column 4,
Line 39, change "comprising" to -- consisting of --.

Column 5,
Line 6, change "methyl" to -- propyl --.

Signed and Sealed this

Twenty-first Day of February, 2006

JON W. DUDAS
*Director of the United States Patent and Trademark Office*